(12) United States Patent
Georgin et al.

(10) Patent No.: US 10,899,325 B2
(45) Date of Patent: Jan. 26, 2021

(54) BRAKE LOAD BALANCE AND RUNWAY CENTERING TECHNIQUES

(71) Applicant: Goodrich Corporation, Charlotte, NC (US)

(72) Inventors: Marc Georgin, Dayton, OH (US); Efrem E. Ayichew, Troy, OH (US)

(73) Assignee: Goodrich Corporation, Charlotte, NC (US)

(*) Notice: Subject to any disclaimer, the term of this patent is extended or adjusted under 35 U.S.C. 154(b) by 92 days.

(21) Appl. No.: 16/378,227

(22) Filed: Apr. 8, 2019

(65) Prior Publication Data

US 2019/0232932 A1 Aug. 1, 2019

Related U.S. Application Data

(62) Division of application No. 15/595,573, filed on May 15, 2017, now Pat. No. 10,300,897.

(51) Int. Cl.
*B64C 25/48* (2006.01)
*B60T 8/17* (2006.01)
(Continued)

(52) U.S. Cl.
CPC ........ *B60T 8/1703* (2013.01); *B60T 8/17613* (2013.01); *B60W 10/188* (2013.01);
(Continued)

(58) Field of Classification Search
CPC ..... B64C 25/426; B64C 25/48; B60T 8/1703; B60T 8/172; B60T 8/1755; B60T 8/176; B60T 8/1761; B60T 8/17613; B60T 8/17616; B60T 8/76; B60T 8/329; B60T 8/58; G05D 1/0083; G05D 1/0202; G05D 1/0204; G05D 1/0676; G05D 1/0816
See application file for complete search history.

(56) References Cited

U.S. PATENT DOCUMENTS 3,614,173 A * 10/1971 Branson ................ B60T 8/1703
303/159
4,221,350 A 9/1980 Moser
(Continued)

FOREIGN PATENT DOCUMENTS

EP 1151877 11/2001
EP 2878504 6/2015
(Continued)

OTHER PUBLICATIONS

Puhn, Fred, "Brake Handbook", HP Books, ISBN 0-89586-232-8, © 1985, Chapters 2, 3, and 9, 38 pages (Year: 1985).*
(Continued)

*Primary Examiner* — Faris S Almatrahi
*Assistant Examiner* — David A Testardi
(74) *Attorney, Agent, or Firm* — Snell & Wilmer L.L.P.

(57) ABSTRACT

A method for controlling brakes includes receiving, by a controller, a first wheel speed from a first wheel speed sensor of a first wheel arrangement, receiving, by the controller, a second wheel speed from a second wheel speed sensor of a second wheel arrangement, calculating, by the controller, a pressure correction, and adjusting, by the controller, a pressure command for at least one of the first wheel arrangement and the second wheel arrangement.

4 Claims, 6 Drawing Sheets

(51) Int. Cl.
| | |
|---|---|
| *B60T 8/1761* | (2006.01) |
| *B60W 10/188* | (2012.01) |
| *B64C 25/42* | (2006.01) |
| *B60W 10/184* | (2012.01) |
| *B60T 8/24* | (2006.01) |
| *G05D 1/08* | (2006.01) |

(52) U.S. Cl.
CPC ............ *B64C 25/426* (2013.01); *B64C 25/48* (2013.01); *B60T 8/1701* (2013.01); *B60T 8/1761* (2013.01); *B60T 8/24* (2013.01); *B60T 2201/03* (2013.01); *B60T 2230/02* (2013.01); *B60T 2250/03* (2013.01); *B60W 10/184* (2013.01); *G05D 1/0816* (2013.01)

(56) References Cited

U.S. PATENT DOCUMENTS

| | | | |
|---|---|---|---|
| 4,412,291 A | 10/1983 | Amberg et al. | |
| 4,482,961 A | 11/1984 | Kilner | |
| 4,898,431 A | 2/1990 | Karnopp | |
| 4,998,593 A | 3/1991 | Karnopp | |
| 5,188,432 A * | 2/1993 | Schmitt | B60T 8/1764 303/147 |
| 5,228,757 A | 7/1993 | Ito | |
| 5,229,944 A | 7/1993 | Yasuno | |
| 5,390,990 A * | 2/1995 | Cook | B60T 8/00 188/181 T |
| 5,407,259 A * | 4/1995 | Itabashi | B60T 8/1764 303/147 |
| 5,657,229 A * | 8/1997 | Naito | B60T 8/175 701/71 |
| 5,667,286 A | 9/1997 | Hoying | |
| 5,671,982 A | 9/1997 | Wanke | |
| 5,707,118 A * | 1/1998 | Kolberg | B60T 8/1703 303/126 |
| 5,732,377 A | 3/1998 | Eckert | |
| 5,842,754 A | 12/1998 | Sano | |
| 6,125,318 A | 9/2000 | Zierolf | |
| 6,205,391 B1 | 3/2001 | Ghoneim | |
| 6,450,588 B2 | 9/2002 | Grote et al. | |
| 6,671,588 B2 | 12/2003 | Otake | |
| 6,851,649 B1 | 2/2005 | Radford | |
| 7,137,673 B2 | 11/2006 | Anwar | |
| 7,734,406 B1 | 6/2010 | Oppenheimer et al. | |
| 7,865,289 B2 | 1/2011 | Dellac | |
| 8,317,131 B2 | 11/2012 | Regis et al. | |
| 9,199,615 B2 | 12/2015 | Cahill | |
| 9,533,756 B2 | 1/2017 | Cox | |
| 2003/0111899 A1 | 6/2003 | Heinemann | |
| 2003/0141128 A1* | 7/2003 | Hessmert | B60T 8/1769 180/233 |
| 2004/0176899 A1 | 9/2004 | Hallowell | |
| 2004/0201272 A1 | 10/2004 | O'Dea | |
| 2005/0040286 A1* | 2/2005 | Radford | B64C 25/46 244/111 |
| 2005/0177308 A1 | 8/2005 | Tange | |
| 2005/0236895 A1 | 10/2005 | Matsumoto | |
| 2006/0097567 A1* | 5/2006 | Butler, III | B60T 8/321 303/20 |
| 2006/0149444 A1 | 7/2006 | Schindler | |
| 2007/0132311 A1 | 6/2007 | Giazotto | |
| 2008/0001471 A1 | 1/2008 | Rudd | |
| 2008/0140264 A1* | 6/2008 | O'Dea | B60T 8/1755 701/1 |
| 2008/0221766 A1 | 9/2008 | Maeda | |
| 2009/0210126 A1 | 8/2009 | Dellac | |
| 2010/0063703 A1* | 3/2010 | Clothier | B60T 8/1703 701/90 |
| 2010/0078519 A1* | 4/2010 | Cahill | B60T 8/885 244/111 |
| 2010/0102173 A1* | 4/2010 | Everett | B60T 8/1703 244/175 |
| 2010/0106347 A1* | 4/2010 | Cahill | B64C 25/44 701/3 |
| 2010/0274457 A1* | 10/2010 | Cahill | B60T 13/741 701/70 |
| 2011/0054757 A1 | 3/2011 | Casella | |
| 2012/0261980 A1* | 10/2012 | Hurst | B60T 8/1703 303/9.75 |
| 2012/0271490 A1 | 10/2012 | Thibault | |
| 2012/0305704 A1 | 12/2012 | Hahn | |
| 2013/0245907 A1* | 9/2013 | McKay | B60T 8/1703 701/71 |
| 2014/0209739 A1 | 7/2014 | Mayolle | |
| 2014/0324311 A1 | 10/2014 | Hagenlocher | |
| 2015/0301531 A1 | 10/2015 | Gama-Valdez | |
| 2016/0016661 A1 | 1/2016 | Howell | |
| 2017/0008503 A1 | 1/2017 | Romana et al. | |
| 2017/0247022 A1* | 8/2017 | Martinez | B60T 8/1764 |

FOREIGN PATENT DOCUMENTS

| | | |
|---|---|---|
| GB | 2463752 | 3/2010 |
| JP | 10086705 | 4/1998 |
| JP | 2008213566 | 9/2008 |
| JP | 2009061837 | 3/2009 |
| JP | 2011068254 | 4/2011 |

OTHER PUBLICATIONS

IDC Engineers Pocket Guide—vol. 5, Formulas and Equations, Copyright 2004 IDC Technologies, 81 numbered pages (Year: 2004).*
Wikipedia article, "Newton's laws of motion", Old revision dated May 5, 2017, 13 pages (Year: 2017).*
Puhn, Fred, "Brake Handbook", HP Books, ISBN 0-89586-232-8, © 1985, Chapters 2, 3, 4, 8, and 9, 52 pages (Year: 1985).*
European Patent Office, European Search Report dated May 12, 2020 in Application No. 20167156.7, (Year: 2020).
European Patent Office, European Search Report dated Sep. 26, 2018 in Application No. 18172388.3, (Year: 2018).
Lambert, Kenneth D., "A Study of Vehicle Properties That Influence Rollover and Their Effect on Electronic Stability Controllers", Master's Thesis, Auburn University, submitted Dec. 17, 2007, 147 pages (Year: 2007).
Smith, Kevin L. et al., "Integrated Braking and Ground Directional Control for Tactical Aircraft", SAE Technical Paper Series, Paper No. 851941, Aerospace Technology Conference & Exposition, Long Beach, CA, Oct. 14-17, 1985, 16 pages (Year: 1985).
U.S. Department of Transportation, "Laboratory Test Procedure for FMVSS 126, Electronic Stability Control Systems", National Highway Traffic Safety Administration, TP-126-02, Nov. 19, 2008, 73 pages (Year: 2008).
Wikipedia article, "Torque", Old revision dated May 12, 2017, 12 pages (Year: 2017).
Wikipedia article, "Yaw-rate sensor", Oct. 24, 2016, 1 page (Year: 2016).
Wikipedia article, "Yaw rotation", Old revision dated Mar. 23, 2017, 4 pages (Year: 2017).
Anderson, Byron H., "Aircraft antiskid analysis verification and refinement", Air Force Flight Dynamics Laboratory, AD-770 300, Sep. 1973, 364 pages (Year: 1973).
Bo, Li et al. "Research on modeling and simulation of aircraft taxiing rectification", 2006 IEEE Conference on Robotics, Automation and Mechatronics, Bangkok, 2006, pp. 1-5 (Year: 2006).
Goldthorpe, Steve H. et al. Guidance and Control Requirements for High-Speed Rollout and Turnoff, NASA Contractor Report 195026, Jan. 1995, 127 pages (Year 1995).
JPO machine translation of JP 2009-061837 (original JP document published Mar. 26, 2009) (Year: 2009).

* cited by examiner

BRAKE LOAD BALANCE AND RUNWAY CENTERING TECHNIQUES

CROSS REFERENCE TO RELATED APPLICATIONS

This application is a divisional of, and claims priority to, and the benefit of U.S. patent application Ser. No. 15/595,573, filed on May 15, 2017, and entitled "BRAKE LOAD BALANCE AND RUNWAY CENTERING TECHNIQUES" which is incorporated by reference herein in its entirety.

FIELD

The present disclosure relates generally to the field of brake control systems, and more specifically to systems and methods for aircraft brake control.

BACKGROUND

Aircraft brake control systems typically employ a brake control unit (BCU). The BCU monitors aircraft data and wheel speeds to determine optimum braking conditions. The BCU generally produces a braking command to control the amount of braking at each wheel.

SUMMARY

Systems and methods disclosed herein may be useful for providing braking to aircraft brakes. A brake control system is disclosed herein, in accordance with various embodiments. A brake control system may comprise an inertial sensor coupled to an aircraft configured to measure a yaw acceleration of the aircraft, a brake control unit (BCU), wherein the BCU receives the yaw acceleration from the inertial sensor, and wherein the BCU is configured to control a brake control device based on the yaw acceleration.

In various embodiments, the BCU may be configured to calculate a pressure correction for the brake control device based upon the yaw acceleration. The BCU may be configured to calculate a force correction for the brake control device based upon the yaw acceleration. The BCU may be configured to calculate a pressure correction using the yaw acceleration and equation $$\Delta P\_j = \pm \frac{\Delta F_{d\_x} * R_{rolling_x} - I_{wh\_x} * \dot{\omega}_{max/min}}{A \cdot k \cdot n \cdot R_b \cdot \mu_{cc}}.$$

The BCU may be configured to calculate the force correction based upon the yaw acceleration and configured to calculate a pressure correction for the brake control device based upon the force correction. The brake control system may further comprise a wheel speed sensor configured to measure a rotational speed of a wheel of the aircraft. The BCU may be configured to calculate a wheel deceleration based upon the rotational speed. The BCU may be configured to calculate a pressure correction based upon the wheel deceleration.

A method for controlling brakes is disclosed herein, in accordance with various embodiments. The method may comprise receiving, by a brake control unit (BCU), a yaw acceleration from an inertial sensor, calculating, by the BCU, a force correction, calculating, by the BCU, a pressure correction, and adjusting, by the BCU, a pressure command for a brake control device.

In various embodiments, the method may further comprise sending, by the BCU, the adjusted pressure command to the brake control device. The force correction may be calculated using at least one of equation $$\Delta F_{d\_x} = \frac{I_L * \ddot{\beta}_1}{L_{LG}}$$

and equation $$\Delta F_{d\_x} = \frac{I_L * \ddot{\beta}_1}{L_{LG}} * \frac{1}{2},$$

where $\ddot{\beta}_1$ is the yaw acceleration, $I_L$ is a moment of inertia of an aircraft, $L_{LG}$ is a distance between a landing gear and an aircraft center of gravity, and $\Delta F_{d\_x}$ is the force correction. The force correction may be calculated using at least one of equation $$\Delta F_{d\_x} = -\frac{I_L * \ddot{\beta}_1}{L_{LG}}$$

and equation $$\Delta F_{d\_x} = -\frac{I_L * \ddot{\beta}_1}{L_{LG}} * \frac{1}{2},$$

where $\ddot{\beta}_1$ is the yaw acceleration, $I_L$ is a moment of inertia of an aircraft, $L_{LG}$ is a distance between a landing gear and an aircraft center of gravity, and $\Delta F_{d\_x}$ is the force correction. The pressure correction may be calculated using the force correction. The pressure correction may be calculated using equation $$\Delta P\_j = \pm \frac{\Delta F_{d\_x} * R_{rolling_x} - I_{wh\_x} * \dot{\omega}_{max/min}}{A \cdot k \cdot n \cdot R_b \cdot \mu_{cc}}.$$

The yaw acceleration may be the yaw acceleration of an aircraft.

A method for controlling brakes is disclosed herein, in accordance with various embodiments. The method may comprise receiving, by a controller, a first wheel speed from a first wheel speed sensor of a first wheel arrangement, receiving, by the controller, a second wheel speed from a second wheel speed sensor of a second wheel arrangement, calculating, by the controller, a pressure correction, and adjusting, by the controller, a pressure command for at least one of the first wheel arrangement and the second wheel arrangement.

In various embodiments, the method may further comprise sending, by the controller, an adjusted pressure command to a brake control device of the second wheel arrangement. The adjusted pressure command may comprise the pressure command adjusted by the pressure correction. The pressure correction may be calculated using equation $$\Delta P\_j = \pm \frac{I_{wh\_x}(\dot{\omega}_{xR} - \dot{\omega}_{xj})}{A \cdot k \cdot n \cdot R_b \cdot \mu_{cc}}.$$

The pressure command may be adjusted by a value of the pressure correction.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the context of the present disclosure, systems and methods may find particular use in connection with aircraft wheel and brake control systems. However, various aspects of the disclosed embodiments may be adapted for optimized performance with a variety of components and in a variety of systems. As such, numerous applications of the present disclosure may be realized.

The following nomenclature is used herein.

$F_d$: Runway drag force;
$R_{rolling}$ Rolling radius;
$I_{wh}$: Wheel arrangement rotational moment of inertia;
$I_L$: Aircraft moment of inertia;
$\dot{\omega}$: Wheel deceleration;
A: Piston area (i.e., surface area of head of piston)
k: number of carbon friction surfaces;
$R_b$: brake force torque arm;
$\mu_{cc}$: Carbon/Carbon co-efficient of friction;
n: number of brake stacks;
$\dot{\omega}_{-xr}$: deceleration of the reference wheel;
$F_{d\_LO}$: Left Outboard runway Drag Force;
$F_{d\_LI}$: Left Inboard runway Drag Force;
$F_{d\_RI}$: Right Inboard runway Drag Force;
$F_{d\_RO}$: Right Outboard Tire Drag Force;
$\ddot{\beta}_l$: Aircraft yaw acceleration;
$L_{LG}$: distance between gear center and aircraft center of gravity; and
$T_{brake}$: Torque generated by a brake stack.

Figure 1:
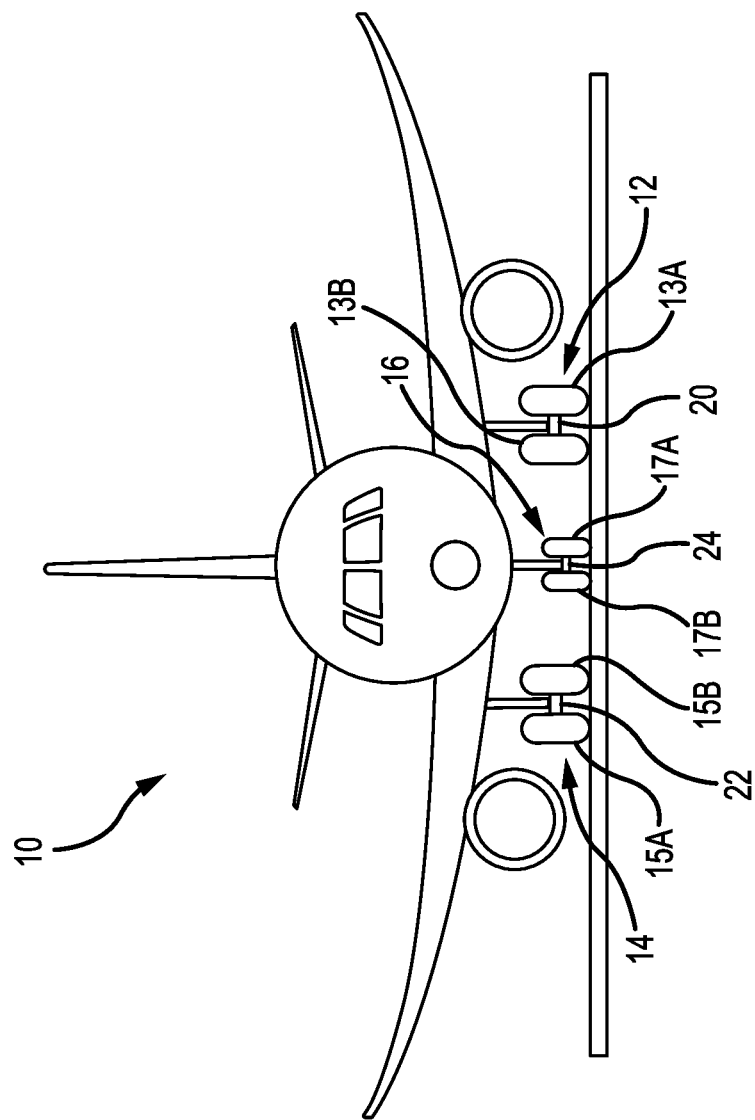
FIG. 1 illustrates a perspective view of an aircraft, in accordance with various embodiments.
Figure 1:
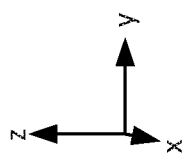

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include wheel 13A and wheel 13B coupled by an axle 20. Landing gear 14 may include wheel 15A and wheel 15B coupled by an axle 22. Landing gear 16 may include nose wheel 17A and nose wheel 17B coupled by an axle 24. The nose wheels differ from the main wheels in that the nose wheels may not include a brake and/or a wheel speed transducer. An XYZ axes is used throughout the drawings to illustrate the axial (y), forward (x) and vertical (z) directions relative to axle 22.

Figure 2:
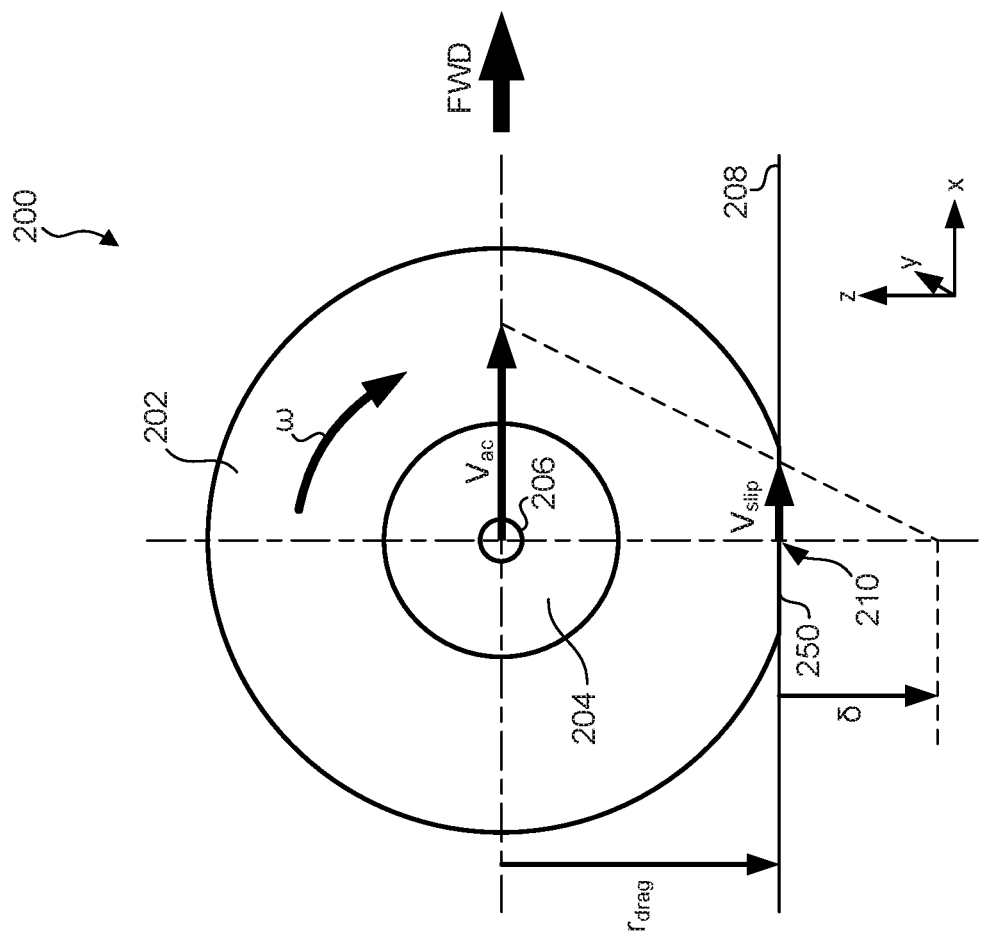
FIG. 2 illustrates a schematic view of a wheel arrangement rolling on a ground surface under load, in accordance with various embodiments.

With reference to FIG. 2, a wheel arrangement 200 is illustrated, in accordance with various embodiments. Wheel arrangement 200 may comprise a tire 202, a wheel 204, and an axle 206. In various embodiments, wheel 15A of FIG. 1 may be similar to wheel 204 of FIG. 2. Tire 202 may be mounted to wheel 204. Wheel 204 may be mounted to axle 206. On the ground, tire 202 may deform such that a surface 250 is in contact with the ground surface 208. Axle 206, wheel 204, and tire 202 may rotate together. During a braking maneuver, wheel arrangement 200 may rotate at a rotational speed ω. Rotational speed ω may be specified as revolutions per minute (rpm) or radians per second (rad/s) of wheel arrangement 200. Wheel arrangement 200 may have an aircraft speed $V_{ac}$. Aircraft speed $V_{ac}$ may be specified as the linear speed (in units of distance per unit of time, for example, feet per second (fps), miles per hour (mph), knots (kt), etc.) of wheel arrangement 200 in the forward direction (i.e., the positive x-direction). Wheel arrangement 200 may comprise a wheel slip speed $V_{slip}$. Wheel slip speed $V_{slip}$ may be specified as the linear speed at which the contact surface 210 of tire 202 is slipping against the ground surface 208. Wheel arrangement 200 may comprise a drag radius $r_{drag}$. Drag radius $r_{drag}$ may be the distance between the axis of rotation of wheel arrangement 200 and the ground surface 208. Typically, a wheel speed sensor is used to determine the rotational speed ω which may be used to estimate or calculate the aircraft speed $V_{ac}$.

Figure 3:
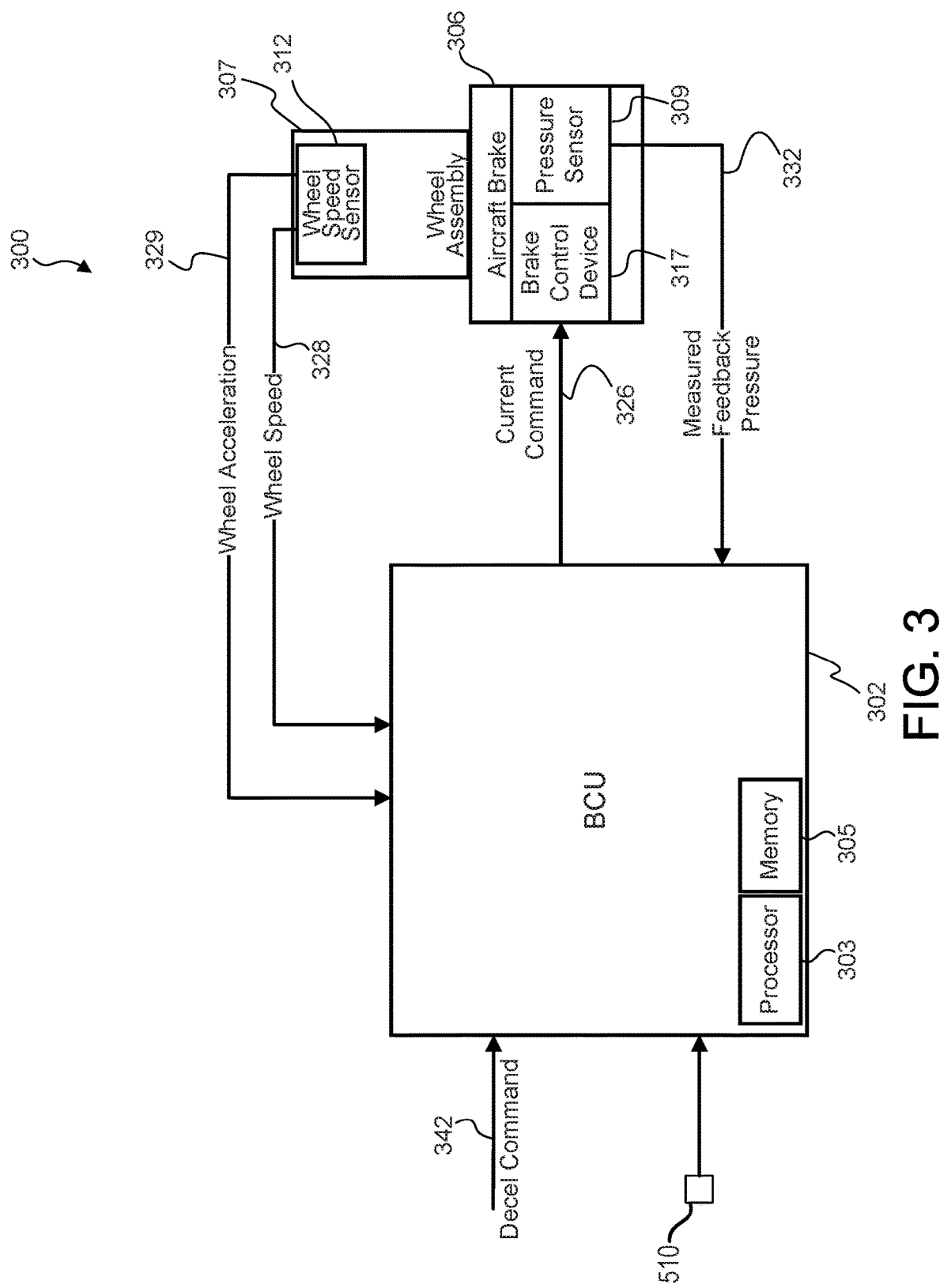
FIG. 3 illustrates a schematic view of a system for braking and brake control, in accordance with various embodiments.

With reference to FIG. 3, system 300 for aircraft brake control is illustrated, in accordance with various embodiments. The system 300 includes a wheel arrangement 307. In various embodiments, wheel arrangement 307 may comprise a wheel mounted to an axle. The wheel arrangement 307 may include a tire mounted to the wheel. Wheel arrangement 307 may comprise a wheel speed sensor 312. Wheel arrangement 307 may comprise brake 306. Wheel arrangement 307 may be similar to wheel arrangement 200, with momentary reference to FIG. 2. Wheel speed sensor 312 may measure a wheel speed 328. Wheel speed sensor 312 may measure a wheel acceleration 329.

In various embodiments, brake 306 may apply a stopping force in response to pressure applied by brake control device 317. Brake control device 317 may be an electronically controlled servo valve configured to actuate a hydraulic valve and thereby control the stopping force generated by brake 306. Brake control device 317 may receive an instruction to apply pressure to one or more friction disks of the brake 306. Brake control device 317 may receive pressure command (also referred to herein as a brake command) 326. In various embodiments, pressure command 326 may be in the form of a valve actuation state. In response, the brake control device 317 may open and/or close a hydraulic valve to varying degrees to adjust the pressure applied to brake 306, thus decelerating the wheel arrangement 307 in a controlled manner. This pressure may be referred to as a braking pressure.

In various embodiments, brake control device 317 may also be an electromechanical brake actuator configured to actuate a puck against the brake stack in response to a current and/or voltage applied to the actuator. In this regard, pressure command 326 may comprise a current signal and/or a voltage signal, in accordance with various embodiments. The force of the puck compressing the brake stack provides braking torque to stop wheel arrangement 307.

In various embodiments, brake 306 may include a pressure sensor 309 for measuring the pressure applied by the brake control device 317. The pressure sensor 309 may transmit the measured feedback pressure 332 to BCU 302 for feedback control of brake control device 317. In embodiments using an electromechanical actuator for brake control device 317, pressure sensor 309 may comprise a force sensor in the form of a load cell output and/or a force estimation derived, for example, in part by the current drawn by the electromechanical actuator.

In various embodiments, system 300 may include a brake control unit (BCU) 302. BCU 302 may comprise instructions stored in memory 305.

In various embodiments, the BCU 302 may include one or more processors 303 and one or more tangible, non-transitory memories 305 in communication with processor 303. Processors 303 are capable of implementing logic. The processor 303 can be a general purpose processor, a digital signal processor (DSP), an application specific integrated circuit (ASIC), a field programmable gate array (FPGA) or other programmable logic device, discrete gate or transistor logic, discrete hardware components, or a combination of processing logic.

In various embodiments, BCU 302 may receive a decel command 342. Decel command 342 may comprise a signal, such as a current or a voltage for example. BCU 302 may receive measured feedback pressure 332 from pressure sensor 309. BCU 302 may receive wheel speed 328 from wheel speed sensor 312. BCU 302 may receive wheel acceleration 329 from wheel speed sensor 312. Decel command 342, measured feedback pressure 332, wheel speed 328, and/or wheel acceleration 329 may be used by BCU 302 to generate pressure command 326.

In various embodiments, during a landing maneuver, an aircraft may experience deviation from a centerline of an aircraft landing runway due to cross wind, steering/rudder centering drift, or uncompensated tire drag force variation between the left and right landing gear brakes. Typically, when in auto-brake mode, runway center deviation is corrected using the rudder pedal by the pilot or manual application of the left or right brakes by the pilot to correct the deviation. In this regard, systems and methods are disclosed herein, for automated heading adjustment using the brakes. The methods, as described herein, may substantially reduce pilot workload during a landing maneuver.

In various embodiments, during landing or rejected take-off (RTO), it may be important to not only measure and control the wheel deceleration, but also to estimate the work of each wheel to aid in maintaining the heading of the aircraft in a straight direction. With combined reference to FIG. 2 and FIG. 3, system 300 may monitor aircraft data and wheel speeds to determine optimum braking conditions. System 300 may provide an assessment of the torque developed by each brake during a braking maneuver for load balance and runway centering purpose.

When an aircraft has landed, the BCU 302 may apply braking based on pilot input (e.g., decel command 342) to decelerate the aircraft. The pilot input is generally an auto-brake setting chosen before landing or pedal signals in the case of manual braking. Systems and methods, described herein, may be particularly useful when the BCU 302 applies braking in auto-brake mode. While braking, the dynamics equation that describes a wheel rotation may be as follows:

$$F_{d\_x} \cdot R_{rolling\_x} - T_{brake\_x} = I_{wh\_x} \cdot \dot{\omega}_x \qquad \text{(Eq. 1)}$$

In equation 1, x denotes any particular wheel arrangement, such as wheel arrangement 307 for example. Stated another way, x may denote the wheel arrangement associated with wheel 13A, wheel 13B, wheel 15B, or wheel 15A, with momentary reference to FIG. 2.

At first, the analysis assumes that the tire drag forces are distributed equally, the difference in brake torque between two brakes (e.g., brake 1 and brake 2) may be as follows:

$$\Delta T_{brake\_j} = I_{wh\_x}(\dot{\omega}_{x2} - \dot{\omega}_{x1}) \qquad \text{(Eq. 2)}$$

The torque generated by a brake stack using pressurized hydraulic cylinders can then be calculated as follows:

$$\Delta T_{brake\_j} = (A\_j \cdot k\_j \cdot n\_j \cdot R_{b\_j} \cdot \mu_{cc\_j}) \cdot \Delta P\_j \qquad \text{(Eq. 3)}$$

The correction applied pressure on the brakes may then be found from equations (2) and (3) as follows:

$$\Delta P\_j = \pm \frac{I_{wh\_x}(\dot{\omega}_{xr} - \dot{\omega}_{xj})}{A \cdot k \cdot n \cdot R_b \cdot \mu_{cc}} \qquad \text{(Eq. 4)}$$

In equation 4, xr denotes a reference wheel from which the other wheel brake pressure will be adjusted. In this regard, depending on the desired implementation, either the lowest, the highest, or average of the decelerations can be used as a reference. Once the reference is chosen, the other command pressures "j" can be increased or decreased to match the reference thereby balancing the applied tire drag force. In equation 4, similar to equation 1, x denotes any particular wheel arrangement, such as wheel arrangement 307 for example. Stated another way, x may denote the wheel arrangement associated with wheel 13A, wheel 13B, wheel 15B, or wheel 15A, with momentary reference to FIG. 2. In this regard, $I_{wh_x}$ denotes a rotational moment of inertia ($I_{wh}$) of any particular wheel arrangement (x) of interest.

Figure 4:
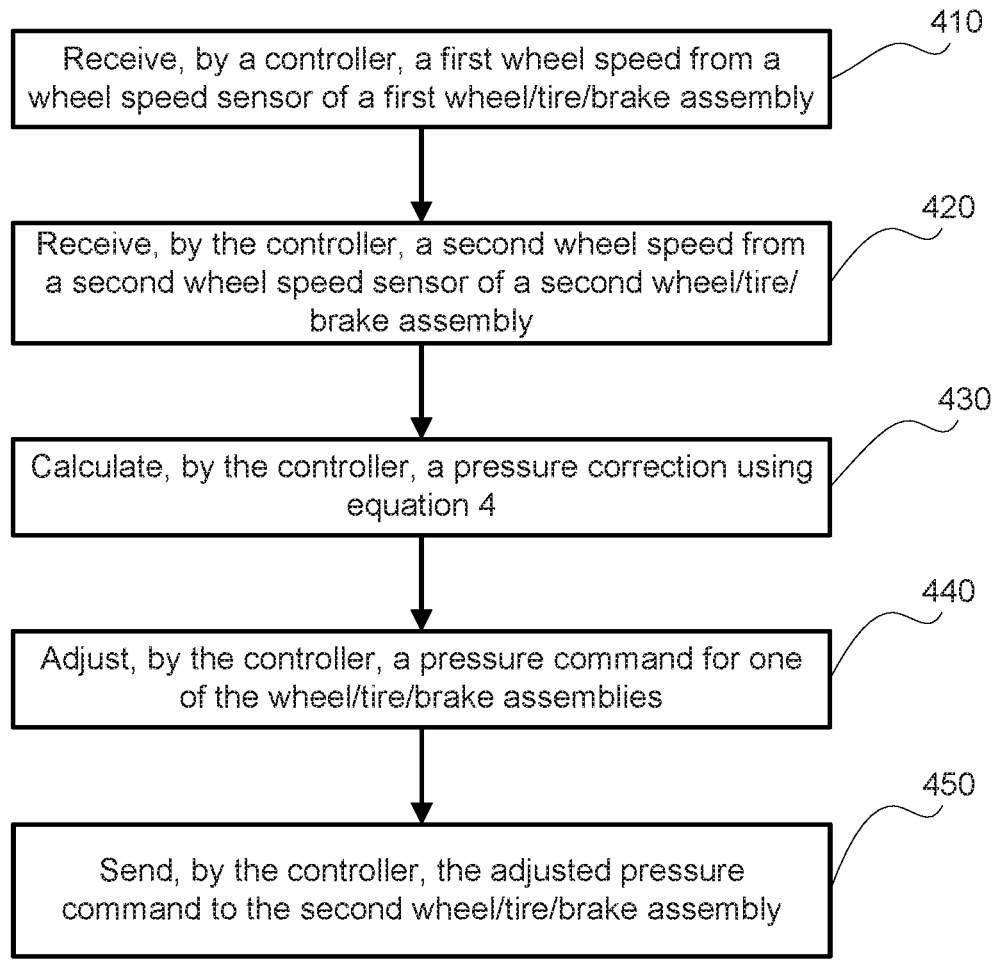
FIG. 4 illustrates a method for controlling brakes, in accordance with various embodiments.

With reference to FIG. 4, a method 400 for brake load balance is provided, in accordance with various embodiments. Method 400 includes receiving, by a controller, a first wheel speed from a wheel speed sensor of a first wheel arrangement (step 410). Method 400 includes receiving, by the controller, a second wheel speed from a second wheel speed sensor of a second wheel arrangement (step 420). Method 400 includes calculating, by the controller, a pressure correction using equation 4 (step 430). Method 400 includes adjusting, by the controller, a pressure command for one of the wheel arrangements (step 440). Method 400 includes sending, by the controller, the adjusted pressure command to the second wheel arrangement (step 450).

Figure 5:
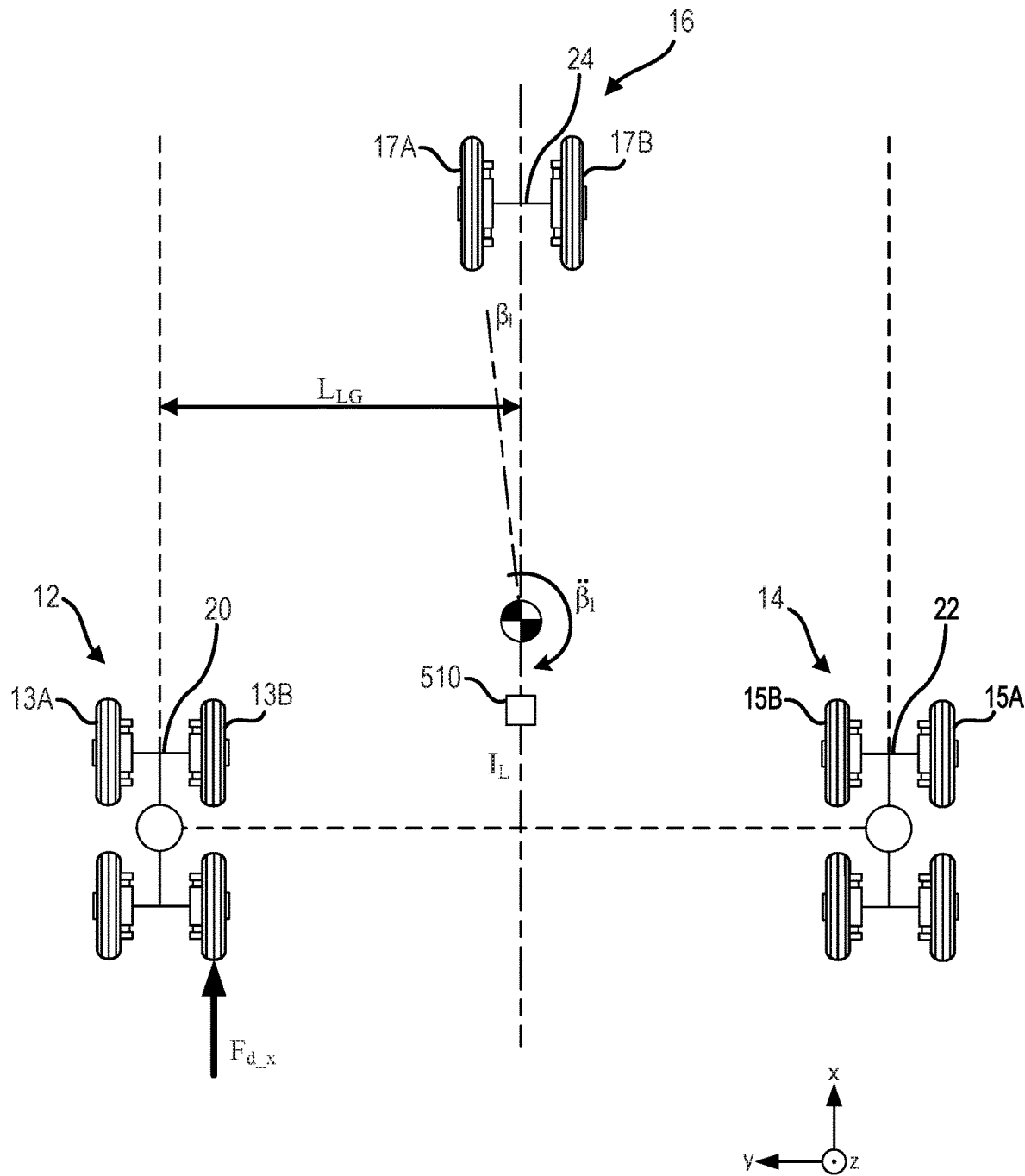
FIG. 5 illustrates a top, looking down view of a landing gear arrangement for an aircraft, in accordance with various embodiments.

With combined reference to FIG. 3, FIG. 4, and FIG. 5, step 410 may include receiving, by BCU 302, a first wheel speed (e.g., wheel speed 328) from a first wheel speed sensor (e.g., wheel speed sensor 312) of a first wheel arrangement (e.g., wheel arrangement 307). Step 420 may include receiving, by BCU 302, a second wheel speed (e.g., wheel speed 328) from a second wheel speed sensor (e.g., wheel speed sensor 312) of a second wheel arrangement (e.g., wheel 15A). Step 430 may include calculating, by BCU 302, a pressure correction (i.e., ΔP) using equation 4. Step 440 may include adjusting, by BCU 302, a pressure command (i.e., pressure command 326) for one of the wheel arrangements. Step 450 may include sending, by BCU 302, the adjusted pressure command (i.e., pressure command 326) to the second wheel arrangement. Although explained with regard to a first wheel arrangement and a second wheel arrangement, it should be understood that method 400 includes sending individual adjusted pressure commands to any number of wheel arrangements. In this regard, each wheel arrangement may receive its own individual adjusted pressure command.

In various embodiments, the method described above may be useful when a wheel is not either locked or skidding. Furthermore, the above control scheme may be a feedforward scheme that does not account for dynamic effects such as brake and tire compliance. In this regard, the effective pressure correction may be filtered or managed in a closed loop manner such that sudden pressure application and release are avoided.

The above description provides a method for load balance using wheel speeds between various wheel arrangements. Now, with reference to the below description, systems and methods are provided for load balance using an inertial sensor which monitors aircraft yaw acceleration ($\ddot{\beta}_l$).

With combined reference to FIG. 1 and FIG. 5, a yaw angle ($\beta_l$) of aircraft 10 may vary in response to the wheels of landing gear 12 spinning slower or faster than the wheels of landing gear 14 as a result of uneven brake force application. In this regard, yaw acceleration ($\ddot{\beta}_l$) may be controlled by controlling the deceleration of the wheels of landing gear 12 and 14. In various embodiments, a brake control system, as described herein, may be configured to maintain equal wheel deceleration between the left wheels (i.e., the wheels associated with landing gear 12) and the right wheels (i.e., the wheels associated with landing gear 14) to minimize the yaw acceleration ($\ddot{\beta}_l$).

Assuming no steering or lateral forces (e.g., from a cross wind) applied to an aircraft, the difference in tire draft forces between left and right landing gear may create a yaw motion described by equation 5 as follows:

$$(F_{d\_LO}+F_{d\_LI}-F_{d\_RO}-F_{d\_RI})*L_{LG}=I_L*\ddot{\beta}_l \qquad \text{(Eq. 5)}$$

In various embodiments, an inertial sensor 510 may be coupled to aircraft 10. Inertial sensor 510 may be used to measure yaw acceleration ($\ddot{\beta}_l$). Inertial sensor 510 may be in electronic communication with BCU 302, with momentary reference to FIG. 3. Based on equation 5, table 1 or table 2 may be used to calculate a force correction using the measured yaw acceleration ($\ddot{\beta}_l$). Tables 1 and 2 provide methods for left gear brake force increase correction and right gear brake force decrease correction. A user or a controller may decide between left gear brake force increase correction or right gear brake force decrease correction. Tables 1 and 2 provide equations for outboard brake correction, inboard brake correction, and shared brake correction. For example, if the aircraft is veering to the right, the left inboard brake may be corrected using the value of row 4, column 3 of table 1.

TABLE 1

| | Right Veering | | | | | |
|---|---|---|---|---|---|---|
| Veering Direction | Right Veering | | | | | |
| Correcting Gear | Left Gear Brake Force Increase Correction | | | Right Gear Brake Force Decrease Correction | | |
| Correcting Brake | Left Inboard brake Correction | Left Outboard brake correction | Shared brake correction | Right Inboard brake Correction | Right Outboard brake correction | Shared brake correction |
| $\Delta F_{d\_LO}$ | 0 | $\dfrac{I_L*\ddot{\beta}_l}{L_{LG}}$ | $\dfrac{I_L*\ddot{\beta}_l}{L_{LG}}*\dfrac{1}{2}$ | 0 | 0 | 0 |
| $\Delta F_{d\_LI}$ | $\dfrac{I_L*\ddot{\beta}_l}{L_{LG}}$ | 0 | $\dfrac{I_L*\ddot{\beta}_l}{L_{LG}}*\dfrac{1}{2}$ | 0 | 0 | 0 |

TABLE 1-continued

| | Right Veering | | | | | |
|---|---|---|---|---|---|---|
| $\Delta F_{d\_RI}$ | 0 | 0 | 0 | $-\dfrac{I_L * \ddot{\beta}_l}{L_{LG}}$ | 0 | $-\dfrac{I_L * \ddot{\beta}_l}{L_{LG}} * \dfrac{1}{2}$ |
| $\Delta F_{d\_RO}$ | 0 | 0 | 0 | 0 | $-\dfrac{I_L * \ddot{\beta}_l}{L_{LG}}$ | $-\dfrac{I_L * \ddot{\beta}_l}{L_{LG}} * \dfrac{1}{2}$ |

TABLE 2

| Veering Direction | Left Veering | | | | | |
|---|---|---|---|---|---|---|
| Correcting Gear | Left Gear Brake Force Decrease Correction | | | Right Gear Brake Force Decrease Correction | | |
| Correcting Brake | Left Inboard brake Correction | Left Outboard brake correction | Shared brake correction | Right Inboard brake Correction | Right Outboard brake correction | Shared brake correction |
| $\Delta F_{d\_LO}$ | 0 | $-\dfrac{I_L * \ddot{\beta}_l}{L_{LG}}$ | $-\dfrac{I_L * \ddot{\beta}_l}{L_{LG}} * \dfrac{1}{2}$ | 0 | 0 | 0 |
| $\Delta F_{d\_LI}$ | $-\dfrac{I_L * \ddot{\beta}_l}{L_{LG}}$ | 0 | $-\dfrac{I_L * \ddot{\beta}_l}{L_{LG}} * \dfrac{1}{2}$ | 0 | 0 | 0 |
| $\Delta F_{d\_RI}$ | 0 | 0 | 0 | $\dfrac{I_L * \ddot{\beta}_l}{L_{LG}}$ | 0 | $\dfrac{I_L * \ddot{\beta}_l}{L_{LG}} * \dfrac{1}{2}$ |
| $\Delta F_{d\_RO}$ | 0 | 0 | 0 | 0 | $\dfrac{I_L * \ddot{\beta}_l}{L_{LG}}$ | $\dfrac{I_L * \ddot{\beta}_l}{L_{LG}} * \dfrac{1}{2}$ |

In various embodiments, an expression for converting runway drag force to brake fluid pressure can be derived from equation 1 as follows:

$$\Delta T_{brake\_x} = \Delta F_{d\_x} * R_{rolling\_x} - I_{wh\_x} * \dot{\omega}_{max/min} \quad (\text{Eq. 6})$$

In equation 6, a maximum allowable wheel deceleration may be set for the case of veering correction by applying brakes, in accordance with various embodiments. In equation 6, a minimum allowable wheel deceleration may be set for the case of veering correction by applying brakes, in accordance with various embodiments. The difference applied to veering correction to the normal pressure command may be adjusted based on equation 4 as follows:

$$\Delta P\_j = \pm \frac{\Delta F_{d\_x} * R_{rolling_x} - I_{wh\_x} * \dot{\omega}_{max/min}}{A \cdot k \cdot n \cdot R_b \cdot \mu_{cc}} \quad (\text{Eq. 7})$$

In this regard, the force correction ($\Delta F_{d\_x}$) from table 1 and/or table 2 may be used to calculate the pressure correction ($\Delta P\_j$). The pressure correction ($\Delta P\_j$) may be used to calculate an adjusted pressure command. The adjusted pressure command may comprise the existing pressure command adjusted by the pressure correction ($\Delta P\_j$).

Figure 6:
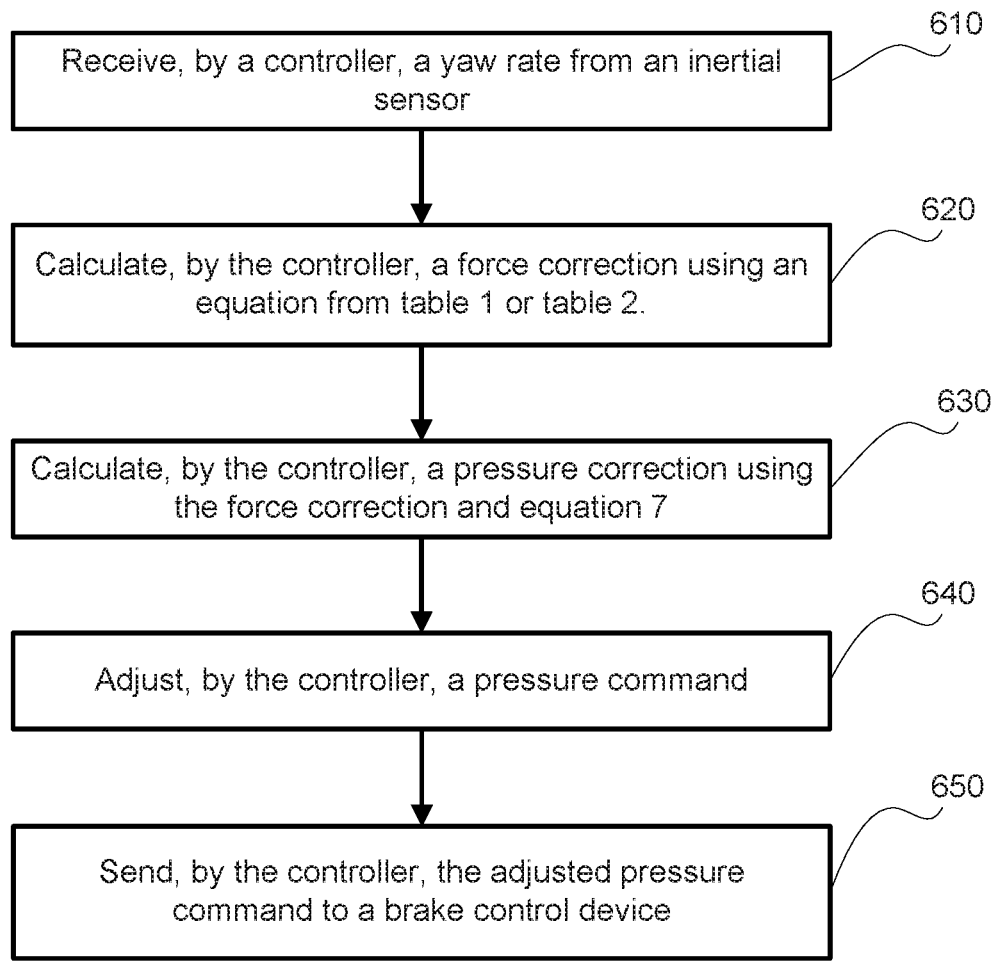
FIG. 6 illustrates a method for controlling brakes, in accordance with various embodiments.

With reference to FIG. 6, a method 600 for brake load balance is provided, in accordance with various embodiments. Method 600 includes receiving, by a controller, a yaw rate from an inertial sensor (step 610). Method 600 calculating, by the controller, a force correction using an equation from table 1 or table 2 (step 620). Method 600 includes calculating, by the controller, a pressure correction using the force correction and equation 7 (step 630). Method 600 includes adjusting, by the controller, a pressure command (step 640). Method 600 includes sending, by the controller, the adjusted pressure command to a brake control device (step 650).

With combined reference to FIG. 3, FIG. 5, and FIG. 6, step 610 may include receiving, by BCU 302, yaw acceleration ($\ddot{\beta}_l$) from inertial sensor 510. Step 620 may include calculating, by BCU 302, a force correction ($\Delta F_{d\_x}$) using one or more of the equations from table 1 or table 2. Step 630 may include calculating, by BCU 302, a pressure correction ($\Delta P\_j$) using the force correction ($\Delta F_{d\_x}$) and equation 7. Step 640 may include adjusting, by BCU 302, a pressure command (i.e., pressure command 326) for a wheel arrangement. Step 650 may include sending, by BCU 302, the adjusted pressure command (i.e., pressure command 326) to a brake control device 317 of the wheel arrangement. It should be understood that method 600 may include sending individual adjusted pressure commands to each wheel arrangement.

Various methods have been described herein with respect to aircraft runway centering. It should be appreciated that the systems and methods described herein minimize aircraft yaw acceleration which may aid in maintaining a linear course on a runway. Thus, the term "runway centering" assumes that the aircraft begins its trajectory at the center of the runway. Furthermore, the systems and methods described herein may find use in maintaining a linear course on a runway wherein the aircraft is offset from a centerline of the runway. In this regard, the systems and methods described herein may not be strictly for "runway centering" but for aircraft yaw acceleration minimization and/or brake load balancing.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for controlling brakes of an aircraft, comprising:
   receiving, by a controller, a first wheel speed from a first wheel speed sensor of a first wheel arrangement, wherein the first wheel arrangement comprises a first brake of the aircraft, the first brake comprises a first brake stack;
   receiving, by the controller, a second wheel speed from a second wheel speed sensor of a second wheel arrangement, wherein the second wheel arrangement comprises a second brake of the aircraft, the second brake comprises a second brake stack;
   calculating, by the controller, a brake pressure correction based upon the first wheel speed and the second wheel speed; and
   adjusting, by the controller, a brake pressure command for at least one of the first brake and the second brake;
   wherein the brake pressure command is adjusted based upon the brake pressure correction;
   the brake pressure correction is calculated for balancing a first tire drag force of the first wheel arrangement and a second tire drag force of the second wheel arrangement; and
   the brake pressure correction is calculated using equation $$\Delta P\_j = \pm \frac{I_{wh_x}(\dot{\omega}_{xr} - \dot{\omega}_{xj})}{A \cdot k \cdot n \cdot R_b \cdot \mu_{cc}},$$

wherein $\Delta P\_j$ denotes the brake pressure correction, $I_{wh_x}$ denotes a rotational moment of inertia of at least one of the first wheel arrangement and the second wheel arrangement, $\dot{\omega}_{xr}$ denotes a wheel deceleration of at least one of the first wheel arrangement and the second wheel arrangement, $\dot{\omega}_{xj}$ denotes a wheel deceleration of the other of the first wheel arrangement and the second wheel arrangement, A denotes a piston area, k denotes a number of carbon friction surfaces, n denotes a number of brake stacks, $R_b$ denotes a brake force torque arm, and $\mu_{cc}$ denotes a coefficient of friction.

2. The method of claim 1, further comprising sending, by the controller, the adjusted brake pressure command to a brake control device of the second wheel arrangement.

3. The method of claim 2, wherein the adjusted brake pressure command comprises the brake pressure command adjusted by the brake pressure correction.

4. The method of claim 1, wherein the brake pressure command is adjusted by a value of the brake pressure correction.

* * * * *